United States Patent [19]

Magee et al.

[11] Patent Number: 5,401,566
[45] Date of Patent: Mar. 28, 1995

[54] COATED FABRICS FOR AIR BAGS

[75] Inventors: Walter L. Magee, Adrian, Mich.; Gerhard Preiner; Johann Müller, both of Burghausen, Germany

[73] Assignee: Wacker Silicones Corporation, Adrian, Mich.

[21] Appl. No.: 112,028

[22] Filed: Aug. 26, 1993

[51] Int. Cl.$^6$ ............................................. B32B 7/00
[52] U.S. Cl. .................................. 428/266; 280/728 R; 428/36.1; 428/260; 428/267; 428/272; 428/290
[58] Field of Search ............... 428/260, 266, 267, 272, 428/290, 36.1; 280/728 R

[56] References Cited

U.S. PATENT DOCUMENTS

| | | | |
|---|---|---|---|
| 3,814,458 | 6/1974 | Acs | 280/150 AB |
| 3,922,443 | 11/1975 | Brown et al. | 428/447 |
| 4,025,485 | 5/1977 | Kodama et al. | 260/375 B |
| 4,921,735 | 5/1990 | Bloch | 428/34.9 |
| 5,008,317 | 4/1991 | Wolfer et al. | 524/262 |
| 5,073,418 | 12/1991 | Thornton et al. | 428/34.9 |
| 5,208,097 | 5/1993 | Honma et al. | 428/266 |

*Primary Examiner*—James J. Bell
*Attorney, Agent, or Firm*—Martin Connaughton

[57] ABSTRACT

Fabrics coated with an organopolysiloxane composition containing (a) an organopolysiloxane having aliphatic unsaturation, (b) an organohydrogenpolysiloxane having SiH groups in which the silicon to hydrogen ratio is from 10:1 to 1:1, (c) a catalyst which is capable of promoting the addition of SiH groups to the aliphatically unsaturated groups, (d) a hydrophobic silica filler, (e) a flame retardant and optionally an adhesion promoting agent.

The coated fabric can be used in manufacturing air bags for automobiles.

28 Claims, No Drawings

COATED FABRICS FOR AIR BAGS

The present invention relates to coated fabrics and more particularly to coated fabrics which are flame retardant. The coated fabrics may be used in the construction of air bags.

BACKGROUND OF THE INVENTION

Coated fabrics which have been used in air bags are described in U.S. Pat. No. 3,814,458 to Acs in which a nylon fabric or fiber glass is coated with aluminumized neoprene. U.S. Pat. No. 4,921,735 to Bloch describes an air bag for a motor vehicle which is constructed of shrinkable and thermofixable synthetic fibers such as polyester, aramid, polyphenylene sulfide and polyimide. The air bag is made exclusively of synthetic fibers having a super-filled weave and is resistant to aging, decay and can be packed tightly without danger of adjacent layers sticking to each other. U.S. Pat. No. 5,073,418 to Thornton, et al., discloses that low permeability fabrics used in air bags are conventionally made of nylon or polyester which has been coated with neoprene, urethane or silicone resin, even though the coating necessarily increases the thickness, stiffness and cost of the cloth while reducing its flexibility, tear strength and shelf-life as the coatings tend to degrade over time.

One of the disadvantages of using coated fabrics in the construction of air bags is that they have a tendency to self adhere when folded very compactly over a period of time. In order to reduce the tendency of the air bag to adhere to itself, it is necessary to treat the rubberized surface with talcum powder to keep the adjacent rubberized surfaces from adhering to one another over a period of time. However, when the air bag is required to perform and unfold explosively, the talcum powder is blown into the air where it can penetrate into the eyes and breathing passages of the passengers, with obvious adverse effects.

U.S. Pat. No. 5,208,097 to Honma et al., describes a base fabric for an air bag coated with a silicone rubber, in which the surface of a fabric comprised of a polyamide fiber or polyester fiber is coated with a thermosetting organopolysiloxane product comprised of an unvulcanized organopolysiloxane rubber containing 2 or more alkenyl groups in a molecule, silica in the form of a fine powder, an organopolysiloxane containing at least 5 silicon atoms in the main chain and further containing 1 or more trialkoxysilyl groups, bonded with a silicon atom through a carbon atom, 1 or more epoxyalkyl groups and 3 or more hydrogen atoms bonded with a silicon atom, a catalyst for the hydrosilylation reaction and an organic solvent and thereafter the coating is heated to harden the organopolysiloxane product.

Compositions for rendering surfaces of substrates, such as polyolefin, polyester and regenerated cellulose films abhesive are described in U.S. Pat. No. 3,922,443 to Brown et al, in which a composition containing a hydroxy terminated diorganopolysiloxane, an organohydrogenpolysiloxane and a platinum complex containing halides and a ligand or donor group is applied to the substrate and then cured by heating.

U.S. Pat. No. 4,025,485 to Kodama et al., describes an organopolysiloxane composition which imparts flame retardancy to glass cloths, glass mats and glass sleeves comprising a dimethylpolysiloxane, an organohydrogenpolysiloxane, a silica filler, zinc carbonate, ceric oxide and a platinum compound.

U.S. Pat. No. 5,008,317 to Wolfer et al., describes compositions which can be cross-linked to form flame retardant organopolysiloxane elastomers containing diorganopolysiloxanes having dimethylsiloxane units and methylvinylsiloxane units, a metal oxide selected from titanium dioxide, zirconium dioxide, Ce(III) oxide, Ce(IV) oxide, platinum compound, an organosilicon compound containing a basic nitrogen bonded via carbon to silicon. These compositions may be cross-linked by the addition of silicon bonded hydrogen to aliphatic carbon-carbon multiple bonds.

It is therefore an object of the present invention to provide a coated fabric which may be used to form an air bag. Another object of the present invention is to provide a coated fabric which may be folded up very compactly without the interleaved surfaces adhering to each other. Still another object of the present invention is to provide a coated fabric which has flame retardant properties. A further object of the present invention is to provide a coated fabric which maintains its strength after prolonged storage.

SUMMARY OF THE INVENTION

The foregoing objects and others which will become apparent from the following description are accomplished in accordance with this invention, generally speaking, by providing a coated fabric which comprises a woven fabric which is impregnated with a crosslinkable silicone composition containing (a) an organopolysiloxane having aliphatic unsaturation, (b) an organohydrogenpolysiloxane having SiH groups in which the silicon to hydrogen ratio is from 10:1 to 1:1, (c) a catalyst which is capable of promoting the addition of SiH groups to the aliphatically unsaturated groups, (d) a hydrophobic silica filler and (e) a flame retardant agent and optionally (f) an adhesion promoting agent.

DESCRIPTION OF THE INVENTION

Fabrics which may be used in manufacturing air bags are synthetic fibers which are thin and flexible and can be folded and compacted so that it can fit into an extremely limited space. The fabric can be woven of multifilament yarn and in various known weaves such as twill, satin, canvas or cotton-duck weave. A preferred weave is the basket weave.

It is essential that the fabric used in forming air bags have high strength characteristics in order to withstand the initial shock of the explosive inflation and immediately thereafter, the impact of someone hitting it as the passengers are thrown forward. The air bag must withstand these forces without bursting, tearing, or stretching to the point where the air bag no longer serves its protective function and it must deflate rapidly.

The fabric can be made from synthetic fibers such as polyester, polyimides (nylon and aramid) polyphenylene sulfide, polyethylene, polypropylene, glass fibers, and the like. Preferably, the fabric is formed from polyester or polyimide yarns and more preferably from nylon yarn.

The organopolysiloxanes employed in the coating composition of this invention generally have recurring units of the formula $$R_xSiO_{\frac{4-x}{2}}$$

where R is selected from the group consisting of monovalent hydrocarbon radicals in which an average of at least two of the monovalent hydrocarbon radicals contain aliphatically unsaturated groups per molecule and x has a value of from 1 to 3, with an average value of from about 1.7 to about 2.1.

It is preferred that the hydrocarbon radicals represented by R each contain from 1 to 18 carbon atoms. Examples of suitable hydrocarbon radicals are alkyl radicals, such as the methyl, ethyl, n-propyl and iso-propyl radicals, as well as the octadecyl radicals; cycloalkyl radicals, such as the cyclopentyl, cyclohexyl and cycloheptyl radicals; alkenyl radicals such as the vinyl and allyl radicals; aryl radicals, such as the phenyl radical; alkaryl radicals, such as the tolyl radicals and aralkyl radicals, such as the benzyl radical and the β-phenylethyl radical. Because of their availability, it is preferred that at least 80% of the R radicals be methyl radicals.

Examples of hydrocarbon radicals having aliphatic unsaturation are vinyl, allyl, methallyl and butadienyl radicals, with vinyl being the preferred radical.

These organopolysiloxanes preferably have a viscosity of from about 5 to 100,000 mPa·s at 25° C. and more preferably from about 20 to 50,000 mPa·s at 25° C.

The organopolysiloxanes employed in the compositions of this invention are produced by the hydrolysis and condensation of the corresponding hydrolyzable silanes. These organopolysiloxanes are preferably linear polymers containing diorganosiloxane units of the formula $R_2SiO$; however, these polymers may also contain minor amounts of other units, such as $RSiO_{3/2}$ units, $R_3SiO_{0.5}$ and/or $SiO_{4/2}$ units, in which R is the same as above.

The preferred organopolysiloxane is a diorganopolysiloxane having the general formula

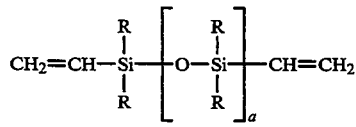

where R is the same as above and a is a number such that the organopolysiloxane has a viscosity of from about 5 to 100,000 mPa·s at 25° C.

The organohydrogenpolysiloxanes employed in the compositions of this invention generally consist of units of the general formula

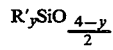

where R' represents hydrogen or a monovalent hydrocarbon radical having from 1 to 18 carbon atoms, in which at least two and preferably three Si-bonded hydrogen atoms are present per molecule and y is 1, 2 or 3. Preferred compounds are those consisting of R'SiO— units, R'$_2$SiO— and R'$_3$SiO$_{0.5}$— units, in which up to one Si-bonded hydrogen atom may be present for each silicon atom and R' is the same as above. It is preferred that the organohydrogenpolysiloxanes have a viscosity of from about 5 to 1,000 mPa·s and more preferably from 10 to 500 mPa·s at 25° C.

The organohydrogenpolysiloxanes may also contain monovalent hydrocarbon radicals having aliphatic unsaturation as well as Si-bonded hydrogen atoms in the same molecule.

The organohydrogenpolysiloxanes which are employed as crosslinking agents may be further represented by the general formula

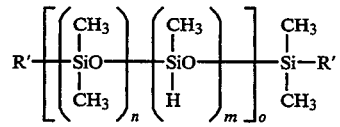

where R' is preferably a hydrogen atom or a methyl radical and more preferably a methyl radical because of its availability, m is a number of from 10 to 100, n is a number of from 0 to 90, in which the ratio of m:n is 1:0 to 1:10, preferably from 1:0 to 1:3 and more preferably from 1:0 to 1:1 and o is a number of at least 10.

It is preferred that the organohydrogenpolysiloxanes contain from 0.15 to about 2.3% by weight of Si-bonded hydrogen atoms, and the silicon valences not satisfied by hydrogen atoms or siloxane oxygen atoms are satisfied by monovalent hydrocarbon radicals free of aliphatic unsaturation. Preferably the organohydrogenpolysiloxane has a silicon to hydrogen ratio of from 10:1 to 1:1 and more preferably from 5:1 to 1:1.

The organohydrogenpolysiloxanes having an average of up to one Si-bonded hydrogen atom per silicon atom are preferably present in the compositions of this invention in an amount such that the ratio of Si-bonded hydrogen to Si-bonded aliphatically unsaturated group ranges from 10:1 to 1:1.

The platinum catalyst employed in this invention may consist of finely dispersed platinum as well as platinum compounds and/or platinum complexes which have been used heretofore to promote the addition of Si-bonded hydrogen atoms to compounds having aliphatically unsaturated groups.

Examples of catalysts which can be used in the invention are finely dispersed platinum on carriers, such as silicon dioxide, aluminum oxide or activated charcoal, platinum halides, such as $PtCl_4$, chloroplatinic acid, $Na_2PtCl_4 \cdot nH_2O$, platinum-olefin complexes, for example, those with ethylene, propylene or butadiene, platinum-alcohol complexes, platinum-styrene complexes such as those described in U.S. Pat. No. 4,394,317 to McAfee et al., platinum-alcoholate complexes, platinum-acetylacetonate, reaction products comprising chloroplatinic acid and monoketones, for example, cyclohexanone, methyl ethyl ketone, acetone, methyl-n-propyl ketone, diisobutyl ketone, acetophenone and mesityl oxide, as well as platinum-vinylsiloxane complexes, such as platinum-divinyltetramethyldisiloxane complexes with or without a detectable amount of inorganic halogen. The platinum-vinylsiloxane complexes are described, for example, in U.S. Pat. Nos. 3,715,334, 3,775,452 and 3,814,730 to Karstedt.

Mixtures of various platinum catalysts, for example, a mixture consisting of the reaction product of chloroplatinic acid and cyclohexanone and a platinum-divinyltetramethyldisiloxane complex which is free of detectable inorganic halogen may be used in the compositions of this invention.

The platinum catalyst is generally employed in an amount of from about 0.5 to 300 ppm (parts per million) by weight and more preferably from about 2 to 50 ppm by weight calculated as platinum and based on the weight of the silicon compounds.

In addition to the organopolysiloxane (a), the organohydrogenpolysiloxane (b) and catalyst (c), the composition also contains a hydrophobic silica filler (d). The silica filler is a pyrogenically produced silicon dioxide or precipitated silicon dioxide having a surface area of at least 50 m²/g and preferably from 150 to 500 m²/g. The silica fillers are treated with silicon compounds which render them hydrophobic.

These silica fillers may be treated with cyclic polysiloxanes such as hexamethylcyclotrisiloxane, octamethylcyclotetrasiloxane, decamethylcyclopentasiloxane, dodecamethylcyclohexasiloxane, octadecamethylcyclononasiloxane, hexaethylcyclotrisiloxane, octaethylcyclotetrasiloxane, trimethyltriethylcyclotrisiloxane, tetramethyltetraethylcyclotetrasiloxane, trimethyltrivinylcyclotrisiloxane, tetramethyltetravinylcyclotetrasiloxane and mixtures thereof.

Other silicon compounds which may be employed in the treatment of the silica fillers are silazanes of the formula

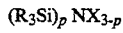
$(R_3Si)_p NX_{3-p}$ where each R is the same as above, X is selected from the group consisting of H and R and p is an integer of 1 or 2. Preferably R in the silazanes is an alkyl radical having from 1 to 8 carbon atoms such as methyl, ethyl, propyl, butyl, pentyl, hexyl, heptyl and octyl radicals; alkenyl radicals having from 2 to 4 carbon atoms such as vinyl, allyl and 1-propenyl radicals.

Examples of preferred silazanes are hexamethyldisilazane, 1,3-diphenylhexamethyldisilazane, and the like.

The silica fillers may also be treated with low molecular weight linear polyorganosiloxanes of the formula

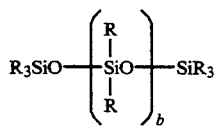

or mixtures of the low molecular weight linear polyorganosiloxanes and cyclosiloxanes, in which R is the same as above and b is a whole number of from 0 to 10. Preferably the linear polyorganosiloxanes have a boiling point at 760 mm below about 250° C.

Examples of preferred polyorganosiloxanes are disiloxanes such as hexamethyldisiloxane, 1,3-divinyltetramethyldisiloxane, 1,3-diphenyltetramethyldisiloxane and low molecular weight polyorganosiloxanes having diorganosiloxy groups of the formula $(R_2SiO)_b$, where R and b are the same as above.

The silica fillers may be treated with other silicon compounds such as organoalkoxysilanes of the formula $R_eSi(OR^1)_{4-e}$ where R is the same as above, $R^1$ is an alkyl radical having from 1 to 8 carbon atoms and e is 1, 2 or 3. Examples of radicals represented by $R^1$ are methyl, ethyl, propyl, butyl, pentyl, hexyl, heptyl and octyl radicals.

Preferably, the silica filler is treated with a silazane, such as a hexamethyldisilazane, tetramethyldivinyldisilazane and in particular mixtures of hexamethyldisilazane and tetramethyldivinyldisilazane in a weight ratio of hexamethyldisilazane to tetramethyldivinyldisilazane of from 6 to 15:1.

The silica filler may be treated with the organosilicon compounds by any conventional method known in the art. In carrying out the treating process, it is desirable that the organosilicon compounds employed be sufficiently volatile so that reasonable temperatures, for example from 35° to 200° C., either at normal pressures or when using reduced pressures or vacuum, readily volatilize the organosilicon compounds. The silica filler is preferably dispersed in the volatile liquid organosilicon compound and then the mixture is heated at temperatures up to those recited above to homogeneously distribute the organosilicon compound throughout the filler mass. The heating, especially at reduced pressures, may also be used to remove excess organosilicon compound. Other methods for treating silica fillers to render them hydrophobic are described in U.S. Pat. Nos. 2,938,009 to Lucas; 3,004,859 to Lichtenwalner; 3,132,961 to Pierpoint et al.; 3,334,062 to Brown et al.; 3,635,743 to Smith and 3,837,878 to Beers.

It has been found that the addition of a flame retardant agent to the silicone compositions used to impregnate fabrics used in manufacturing air bags is essential because of the amount of heat generated by gases blown into the air bag on impact.

Compositions which may be employed to impart flame retardancy to the impregnated fabrics are described in U.S. Pat. No. 5,008,317 to Wolfer et al., which is incorporated by reference. The flame retardant compositions contain (1) from 60 to 80% by weight of a diorganopolysiloxane having 75 to 85 mol percent of dimethylsiloxane units and 15 to 25 mol percent of vinylmethylsiloxane units, (2) 20 to 35% by weight of a metal oxide selected from the group consisting of titanium dioxide, zirconium dioxide, zinc oxide, Ce(III) oxide and Ce(IV) oxide, (3) 0.05 to 0.25% by weight of platinum calculated as the element and (4) 1 to 5% by weight of an organosilicon compound having basic nitrogen bonded via carbon to silicon, in which the sum of (1) to (4) adds up to 100% by weight based on the total weight of the flame retardant composition.

The organosilicon compound having basic nitrogen bonded via carbon to silicon may be a silane of the formula $Y_cR^2_dSi(OR^3)_{4-c-d}$, a disiloxane of the formula $(Y_eR^2_fSi)_2O$, or organopolysiloxanes of the formula

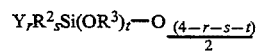
$Y_rR^2_sSi(OR^3)_t—O_{\frac{(4-r-s-t)}{2}}$ in which $R^2$ is a monovalent hydrocarbon radical having from 1 to 18 carbon atoms per radical, $R^3$ is an alkyl radical having from 1 to 8 carbon atoms per radical or a radical of the formula —$SiR_3$, in which R is the same as above, Y is a monovalent SiC-bonded organic radical having a basic nitrogen, c is 1, 2 or 3, d is 0, 1 or 2, e is 1, 2 or 3, preferably 1, with the proviso that the disiloxanes have at least one Y radical per molecule and f is 0, 1, 2 or 3 and more preferably 2, r is 1 or 2, s is 0, 1, 2 or 3 and t is 0, 1 or 2.

The examples of monovalent hydrocarbon radicals represented by R are also representative of the monovalent hydrocarbon radicals $R^2$.

Examples of alkyl radicals having from 1 to 8 carbon atoms are the methyl, ethyl, propyl, butyl radicals and octyl radicals.

Preferably the Y radicals are those of the formula $R^4NHR^5$, in which $R^4$ represents hydrogen or alkyl radicals, or cycloalkyl radicals or aminoalkyl radicals having from 1 to 8 carbon atoms per radical and $R^5$ are straight-chain or branched hydrocarbon radicals which are free of aliphatic unsaturation, having one carbon atom or 3 or 4 carbon atoms per radical, and more preferably a radical of the formula —$(CH_2)_3$—.

Components (1) to (4) of the flame retardant composition are preferably mixed together in any order in a mixer or kneader. After mixing or kneading for at least two hours and standing at room temperature for from two to three days the composition can be used. Preferably, the mixture is ready to use after heating for at least 2 hours at a temperature of from 80° to 150° C.

The amount of flame retardant composition which is preferably added to the crosslinkable silicone composition ranges from about 1 to 8% by weight and more preferably from 1 to 5% by weight based on the weight of the crosslinkable silicone composition.

Other flame retardant agents which may be employed in the composition of this invention are carbon black and aluminum hydrate. Carbon black and/or aluminum hydrate may be combined with platinum to impart flame retardant properties to the composition.

The amount of platinum may range from 3 to 250 ppm by weight and more prefrably from 10 to 150 ppm, calculated as metallic platinum and based on the weight of organopolysiloxane (a). The platinum is added in the form of a fine powder or in the form of platinum powder supported on a carrier such as alumina, silica gel or asbestos. Platinum compounds such as chloroplatinic acid or platinum complexes such as those mentioned heretofore as catalysts in promoting the addition of Si-bonded hydrogen compounds to compounds having aliphatically unsaturated groups may be employed.

The platinum or platinum compounds may be dispersed in organic solvents such as ethanol, isopropanol, benzene, toluene, xylene, or in organopolysiloxane oils.

Platinum may be used in combination with carbon black to form a flame retardant silicone coating composition. Examples of suitable carbon black which may be employed are acetylene carbon black, lamp black, fine thermal carbon black, furnace carbon black or channel carbon black. The amount of carbon black may range from 1 to 20 parts by weight of carbon black, preferably from 1.5 to 15 parts by weight and more preferably from 2 to 10 parts by weight of carbon black based on 100 parts by weight of organopolysiloxane (a).

The carbon black preferably has a surface area of at least 10 m$^2$/g and a particle size of from 0.05 to 0.20 micron.

Aluminum hydrate may be employed in combination with the platinum or in combination with platinum and carbon black. The amount of aluminum hydrate may range from about 50 to 150 parts by weight, preferably from 70 to 130 parts by weight and more preferably from 100 to 125 parts by weight based on 100 parts by weight of organopolysiloxane (a).

The aluminum hydrate preferably has a specific surface area of at least 2 m$^2$/g, more preferably a surface area greater than 6 m$^2$/g and especially a surface area of from 8 to 20 m$^2$/g. A lower surface area will yield acceptable flame retardant properties; however, it is preferred that the surface area be greater than about 2 m$^2$/g in order to obtain a coated fabric having acceptable flame retardant properties.

Preferably, the aluminum hydrate has a maximum particle size less than about 4 microns and more preferably less than 2 microns; however, the average particle size may range from about 0.5 to about 50 microns.

Treated aluminum hydrate, i.e., aluminum hydrate which has been treated with cyclic siloxanes, such as octamethylcyclotetrasiloxane or silazanes or a mixture of silazanes and cyclic siloxanes or other treating agents such as metallic stearates which are known in the art may be employed in the compositions of this invention.

Other flame retardant agents which may be employed in the composition of this invention are halogenated organic compounds such as perchloropentacyclodecane and metal salts such as antimony oxides, tricresyl phosphate and phosphate esters.

Also, it has been found that the moisture content of the fabric affects the adhesion of the silicone composition. Thus, when the fabric, such as nylon contains more than about 2% by weight of moisture, based on the weight of the fabric, the adhesion of the silicone composition to the fabric is substantially reduced.

Although the fabric may be dried in a drying oven to a moisture content below about 2% by weight based on the weight of the fabric prior to the application of the silicone coating, it is often expedient to coat the fabric without a drying step. When the moisture content of the fabric is above about 2% by weight, it is preferred that the fabric be first treated with an adhesion promoting agent or the adhesion promoting agent incorporated in the silicone coating composition and then the silicone coating composition applied to the fabric.

Adhesion promoting agents which may be employed are organoalkoxysilanes or mixtures of organoalkoxysilanes.

Organoalkoxysilanes which may be employed as adhesion promoting agents may be represented by the formula R"Si(OR$^1$)$_3$ where R" is the same as R above or radicals selected from the formulas

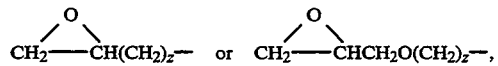

$R^1$ is the same as above and z is a number of from 1 to 10.

Examples of suitable organoalkoxysilanes which may be employed to promote adhesion of the silicone coating composition to the fabric are methyltrimethoxysilane, methyltriethoxysilane, methyltripropoxysilane, methyltributoxysilane, methyltripentoxysilane, methyltrihexoxysilane, methyltrioctoxysilane, methyltridecoxysilane, methyltrioctadecoxysilane, ethyltrimethoxysilane, ethyltriethoxysilane, ethyltripropoxysilane, ethyltributoxysilane, ethyltrihexoxysilane, ethyltridecoxysilane, propyltrimethoxysilane, propyltriethoxysilane, propyltripropoxysilane, propyltributoxysilane, propyltrihexoxysilane, propyltrioctoxysilane, propyltridecoxysilane, butyltrimethoxysilane, butyltriethoxysilane, butyltripropoxysilane, butyltributoxysilane, butyltrihexoxysilane, butyltrioctoxysilane, pentyltrimethoxysilane, pentyltriethoxysilane, hexyltrimethoxysilane, hexyltriethoxysilane, hexytripropoxysilane, hexyltributoxysilane, hexyltrihexoxysilane, hexyltrioctoxysilane, octyltrimethoxysilane, octyltriethoxysilane, octyltripropoxysilane, octyltributoxysilane, octyltrihexoxysilane, phenyltrimethoxysilane, phenyltriethoxysilane and phenyltripropoxysilane. Other organosilanes which may be employed as adhesion promoters are vinyltrimethoxysilane, vinyltriethoxysilane, vinyltripropoxysilane, vinyltributoxysilane, vinyltrihexoxysilane, vinyltrioctoxysilane, allyltrimethoxysilane, allyltriethoxysilane, allyltripropoxysilane, allyltrioctoxysilane, glycidoxypropyltrimethoxysilane, glycidoxypropyltriethoxysilane, glycidoxypropyltripropoxysilane, ethenyltriacetate silanetriol, trimethoxy(3-oxiranylmethoxypropyl)silane and mixtures thereof.

When the adhesion promoting agent is applied to the fabric prior to the application of the silicone coating, it is preferred that adhesion promoting agent be dissolved in a solvent. Examples of suitable solvents which may be employed are water, alcohols such as ethanol, ketones such as ace-tone and hydrocarbon solvents such as benzene, toluene and xylene. The preferred solvents are water and ethanol.

The amount of adhesion promoting agent present in the solvent may range from 1 to 20%, preferably from 1 to 10% and more preferably from 2 to 5% by weight based on the weight of the solution.

When the fabric is treated with the adhesion promoting agent is prior to the application of the silicone coating, it is preferred that the adhesion promoting agent be dried before the application of the silicone coating. The treated fabric may be dried in an air oven at a temperature sufficient to vaporize off the solvent.

When the adhesion promoting agent is incorporated in the silicone coating composition, it is preferably added to the composition in an amount of from 1 to 20% by weight, preferably from 1 to 10% and more preferably from 2 to 5% by weight based on the weight of the silicone coating composition. The adhesion promoting agent may be added to the silicone composition or it may be diluted with a solvent and then added to the silicone coating composition.

In addition to the organopolysiloxane (a), a crosslinking agent (b), a catalyst (c) which is capable of promoting the addition of SiH groups to aliphatically unsaturated groups such as platinum metal, compound or complex thereof, a hydrophobic silica filler (d), flame retardant (e), and optionally an adhesion promoting agent (f), the compositions of this invention may optionally contain other fillers (g). Fillers which may be employed are, for example, reinforcing fillers, that is fillers having a surface area of at least 50 m$^2$/g, such as pyrogenically produced silicon dioxide, silicon dioxide aerogels, that is to say, silicic acid hydrogels dehydrated so as to maintain the structure, and precipitated silicon dioxide. Examples of non-reinforcing fillers, that is fillers having a surface area of less than 50 m$^2$/g, are calcium carbonate, quartz powder, diatomaceous earth, titanium dioxide, zirconium silicate, aluminum silicate, zinc oxide, plaster of paris, so-called "molecular sieves" and asbestine, that is to say a magnesium-calcium silicate which resembles talc.

Preferably, the fillers are used in amounts of from 0 to 200% by weight, especially from 5 to 150% by weight, based on the total weight of organopolysiloxane (a). Non-reinforcing fillers are generally used in amounts of at least 20% by weight, based on the total weight of the organopolysiloxane (a), whereas reinforcing fillers are generally used in amounts of from 1 to 50% by weight, based on the total weight of the organopolysiloxane (a). It is, however, possible to use larger amounts of reinforcing fillers provided that the workability of the composition does not suffer as a result.

The composition of this invention may also contain fibrous fillers, such as glass fibers having an average length up to about 0.5 mm, and/or asbestos fibers.

Other additives which may be employed in the compositions of this invention are pigments, soluble dyes, scents, organopolysiloxane resins, including those comprising (CH$_3$)$_3$SiO$_{\frac{1}{2}}$ and SiO$_{4/2}$ units, purely organic resins such as powders of homopolymers or copolymers of acrylonitrile, polyvinylchloride, corrosion inhibitors, oxidation inhibitors, heat stabilizers, solvents, plasticizers such as trimethylsiloxy terminated organopolysiloxanes which are fluid at room temperature and the like.

The order of addition of the ingredients to form the composition of this invention is not critical and it can be prepared under anhydrous conditions in any conventional manner known in the art. The method of addition as well as the sequence of addition is not critical; however, it is preferred that the crosslinking agent be added as one of the last ingredients to the composition.

Conventional methods for forming homogenous mixtures may be employed, such as combining the organopolysiloxane (a) with the flame retardant (e) and optional filler (g) and then adding the other ingredients to the mixture. The platinum compounds can conveniently be added by mixing with a diluent such as organopolysiloxane fluids to assist in dispersion because the amount used is very small.

The composition may be applied to the fabric by any known method, such as, for example, knife coating, roll coating, reverse roll coating, by gravure cylinder, immersion or spray coating. The compositions may be applied in widely varying amounts, for example up to 1000 g/m$^2$, preferably in amounts of from 20 to 600 g/m$^2$ and more preferably from 20 to 100 g/m$^2$.

After coating, the composition is heated by conventional methods, such as oven, hot air, infra-red or ionising irradiation. Temperatures of from 30° to 200° C. and more preferably from 100 to 200° C. may be used to cure the composition.

In the following examples, all parts are by weight, all viscosities are at 25° C. and all percentages are by weight unless otherwise specified.

PREPARATION OF PLATINUM CATALYST (a) About 20 parts of sodium bicarbonate are added to a mixture containing 10 parts of H$_2$PtCl$_6$·6H$_2$O, parts of 1,3-divinyl-1,1,3,3-tetramethyldisiloxane and 50 parts of ethanol. The mixture is refluxed for 30 minutes with stirring, then allowed to stand for 15 hours and then subsequently filtered. The volatile components are distilled off from the filtrate at about 16 hPa(abs.). About 17 parts of a liquid are obtained as residue, which is dissolved in benzene. The solution is filtered and the benzene distilled off from the filtrate. The residue is mixed with dimethylpolysiloxane having dimethylvinylsiloxane units as terminal units and a viscosity of 1400 mPa·s at 25° C. as diluent, in an amount such that the mixture contains 1% by weight of platinum, calculated as the element.

(b) About 10 parts of chloroplatinic acid are dried in an air oven at a temperature of about 125° C. for 2 hours and then sufficient ethanol is added to form a mixture containing 1% by weight of platinum, calculated as the element.

PREPARATION OF FLAME RETARDANT COMPOSITION (c) About 100 parts of a dimethylpolysiloxane having 20 mol percent of vinylmethylsiloxane units and a viscosity of 50000 mPa·s at 25° C. are homogeneously mixed in a stirring device with 50 parts of titanium dioxide produced pyrogenically in the gas phase and then 25 parts of the mixture of platinumvinylsiloxane complex and diluent containing 1% by weight of platinum, calculated as the element, are added. After the mixture has been thoroughly mixed, 4 parts of N-(2-aminoethyl)-3-aminopropyl-trimethoxysilane are mixed into the mixture. The mixture is then heated slowly to 150° C. with vigorous stirring and stirred for an additional two hours at 150° C.

EXAMPLE 1

(A) About 39.8 parts of fumed silica which was previously treated with hexamethyldisilazane and 19.8 parts of a vinyl terminated polydimethylsiloxane having a viscosity of about 20,000 mPa·s at 25° C., are mixed in a kneader and then 0.11 part of ethynyl cyclohexanol, 18.5 parts of aluminum hydrate 632SP (available from Solem Industries), 14.4 parts of vinyl terminated polydimethylsiloxane having a viscosity of about 4,000 mPa·s at 25° C. and 0.14 part of a platinum-vinyl-siloxane catalyst prepared in accordance with (a) above, are added to the mixture with agitation.

(B) About 56.6 parts of fumed silica which was previously treated with hexamethyldisilazane and 28.3 parts of vinyl terminated polydimethylsiloxane having a viscosity of about 20,000 mPa·s at 25° C. are mixed in a kneader and about 9.4 parts of vinyl terminated polydimethylsiloxane having a viscosity of about 4,000 mPa·s at 25° C., 5.7 parts of an methylhydrogenpolysiloxane having a viscosity of about 50 mPa·s at 25° C. and a silicon to hydrogen ratio of about 3 to 1 and 0.02 part of ethynyl cyclohexanol are added to the mixture with agitation.

(C) A silicone coating composition is prepared by mixing about 50 parts by weight of the mixture prepared in (A) above with 50 parts by weight of the mixture prepared in (B) above in a kneader and the resultant composition is applied to woven nylon fabric to a thickness of about 50μ by direct roller coating. The coated fabric is heated to a temperature of about 50° C. for about 30 minutes to form a silicone impregnated nylon fabric. The elastomeric coating exhibited good adhesion to the nylon fabric and when the coated surface is folded on itself and subjected to pressure at a temperature of 70° C. for 24 hours, the coated nylon fabric did not adhere to itself.

EXAMPLE 2

The procedure of Example 1(A) is repeated, except that 28.5 parts of aluminum hydrate 632SP are added instead of 18.5 parts of aluminum hydrate 632SP. The resultant composition is combined with composition 1(B) in a 1:1 ratio and applied to a woven nylon fabric at a thickness of 50μ by direct roller coating. The coated fabric is heated to a temperature of 50° C. for about 30 minutes. When the coated fabric is folded upon itself and subjected to pressure at a temperature of 70° C. for 24 hours, no evidence of adhesion between the overlapped layers of coated fabric is observed.

EXAMPLE 3

The procedure of Example 1(A) is repeated, except that 0.8 part of vinyltrimethoxysilane is added to the composition. The procedure of Example 1(B) is repeated, except that 5.7 parts of methylhydrogenpolysiloxane having a viscosity of 50 mPa·s at 25° C. and a silicon to hydrogen ratio of 1:1 are substituted for the 5.7 parts of the methylhydrogenpolysiloxane having a hydrogen to silicon ratio of about 1:3. Compositions (A) and (B) are combined in a 1:1 ratio and applied to a woven nylon fabric at a thickness of 50μ by direct roller coating. The resultant coated fabric is heated to a temperature of 50° C. for about 30 minutes. When the coated fabric is folded upon itself and subjected to pressure at a temperature of 70° C. for 24 hours, no evidence of adhesion between the overlapped layers of coated fabric is observed.

EXAMPLE 4

The procedure of Example 1(A) is repeated, except that 39.8 parts of fumed silica treated with a mixture containing hexamethyldisilazane and tetramethyldivinyldisilazane in a weight ratio of 12:1 are substituted for the 39.8 parts of fumed silica treated with hexamethyldisilazane. The procedure of Example 1(B) is repeated except that 56.6 parts of fumed silica treated with a mixture containing hexamethyldisilazane and tetramethyldivinyldisilazane in a weight ratio of 12:1 are substituted for the 56.6 parts of fumed silica treated with hexamethyldisilazane. Compositions (A) and (B) are combined in a 1:1 ratio and applied to a woven nylon fabric at a thickness of 50μ by direct roller coating. After heating the coated fabric at 50° C. for 30 minutes, the fabric is folded upon itself and subjected to pressure at a temperature of 70° C. for 24 hours. No evidence of adhesion is observed between the overlapped layers of the coated fabric.

EXAMPLE 5

The procedure of Example 1(A) is repeated except that 39.8 parts of fumed silica treated with a mixture containing hexamethyldisilazane and tetramethyldivinyldisilazane in a weight ratio of 12:1 are substituted for the 39.8 parts of fumed silica treated with hexamethyldisilazane. Compositions (A) and (B) are combined in a 1:1 ratio and applied to a woven nylon fabric at a thickness of 50μ by direct roller coating. After heating the coated fabric at 50° C. for 30 minutes, the fabric is folded upon itself and subjected to pressure at a temperature of 70° C. for 24 hours. No evidence of adhesion is observed between the overlapped layers of the coated fabric.

EXAMPLE 6

(A) To a kneader containing 52.8 parts of fumed silica which was previously treated with a mixture containing hexamethyldisilazane and tetramethyldivinyldisilazane in a weight ratio of 12:1 are added 28.5 parts of a vinyl terminated polydimethylsiloxane having a viscosity of 5000 mPa·s at 25° C., 15 parts of aluminum hydrate 632SP, 2.6 parts of pigment red iron oxide, 0.1 part of ethynyl cyclohexanol and 1.2 parts of a platinumvinylsiloxane catalyst prepared in accordance with (a) above. The resultant mixture is kneaded for 30 minutes in a nitrogen atmosphere.

(B) To a kneader containing 68.5 parts of fumed silica which was previously treated with a mixture containing hexamethyldisilazane and tetramethyldivinyldisilazane in a weight ratio of 12:1 are added 25.3 parts of a vinyl terminated polydimethylsiloxane having a viscosity of 5000 mPa·s at 25° C. and 6.2 parts of a methylhydrogenpolysiloxane having a viscosity of 50 mPa·s at 25° C. and a silicon to hydrogen ratio of 3:1. The resultant mixture is kneaded for 30 minutes at room temperature in a nitrogen atmosphere.

(C) Compositions (A) and (B) prepared above are mixed in a kneader in a weight ratio of 1:1 and applied to a woven nylon fabric at a thickness of about 50μ by direct roller coating. The coated fabric was heated to a temperature of about 50° C. for about 30 minutes. The coated fabric is folded upon itself and subjected to pressure at a temperature of 70° C. for 24 hours. No evidence of adhesion is observed between the overlapped layers of the coated fabric.

EXAMPLE 7

(A) To a kneader containing 53.7 parts of fumed silica which was previously treated with a mixture containing hexamethyldisilazane and tetramethyldivinyldisilazane in a weight ratio of 12:1 are added 26.9 parts of a vinyl terminated polydimethylsiloxane having a viscosity of 5000 mPa·s at 25° C., 17.9 parts of vinyl terminated polydimethylsiloxane having a viscosity of 4000 mPa·s at 25° C., 0.6 part of methylbutynol, 0.9 parts of pigment red iron oxide and 0.2 part of a platinum vinylsiloxane catalyst prepared in accordance with (a) above. The mixture is kneaded at room temperature for 30 minutes in a nitrogen atmosphere.

(B) To a kneader containing 51.7 parts of fumed silica treated in accordance with (A) above, are added 26.9 parts of vinyl terminated polydimethyldiloxane having a viscosity of 5000 mPa·s at 25° C., 17.3 parts of a vinyl terminated polydimethylsiloxane having a viscosity of 4000 mPa·s at 25° C. and 8.2 parts of a methylhydrogenpolysiloxane having a viscosity of 100 mPa·s at 25° C. and a silicon to hydrogen ratio of 1:1. The resultant mixture is kneaded for 30 minutes at room temperature in a nitrogen atmosphere.

(C) Compositions (A) and (B) prepared above are mixed in a kneader in a weight ratio of 1:1 and applied to a woven fabric at a thickness of about 50μ by direct roller coating. The coated fabric was heated to a temperature of about 50° C. for about 30 minutes. The coated fabric is folded upon itself and put under pressure at a temperature of 70° C. for 24 hours. No evidence of any adhesion is observed between the overlapped layers of the coated fabric.

EXAMPLE 8

The procedure of Example 1 is repeated except that a platinum catalyst prepared in accordance with (b) above, is substituted for the platinum catalyst (a) prepared above.

Comparison Example V₁

(A) The procedure of Example 1(B) is repeated except that 7 parts by weight of a methylhydrogenpolysiloxane having terminal hydrogen atoms and a silicon to hydrogen ratio of 20:1 is substituted for the 5.7 parts of the methylhydrogenpolysiloxane.

(B) A silicone composition is prepared by mixing 50 parts by weight of the mixture prepared in 1(A) with 50 parts of the mixture prepared in accordance with Comparison Example V₁(A) above in a kneader and the resultant composition is applied to woven nylon fabric to a thickness of about 50μ with a roller. The coated fabric is heated to about 50° C. for about 30 minutes to form an impregnated fabric. The resultant elastomeric coating is easily removed from the fabric.

EXAMPLE 9

About 2.1 parts of an additive consisting of vinyltriethoxysilane are mixed with 100 parts of a mixture prepared in accordance with Example 1(C). The resultant mixture is applied to samples of woven nylon fabric having different moisture content to a thickness of about 50μ by direct roller coating. The coated fabric is heated to a temperature of about 50° C. for about 30 minutes. The adhesion of the silicone coating to the nylon fabric is determined in accordance with the procedure described in ASTM D751-89. The results are shown in Table I.

EXAMPLE 10

The procedure of Example 9 is repeated except that different amounts of an additive containing ethenyltriacetate silanetriol and trimethoxy(3-oxiranylmethoxypropyl)silane in a weight ratio of 1 to 1.38 are substituted for the vinyltriethoxysilane. The results are shown in Table I.

Comparison Example V₂

The procedure of Example 9 is repeated except that the nylon fabric is dried at 180° C. for 3 minutes just prior to coating with the silicone composition prepared in accordance with Example 1(C). The results are shown in Table I.

TABLE I

|  | Moisture Content | Additive | Adhesion |
|---|---|---|---|
| Example |  |  |  |
| 9 | 0–2% (1) | 2% (2) | 14 N/cm |
|  | 2–4% | 2% (2) | 10 N/cm |
|  | 4–8% | 2% (2) | 4 N/cm |
| 10 | 0–2% (1) | 2% (3) | 11 N/cm |
|  | 2–4% | 2% (3) | 6 N/cm |
|  | 4–8% | 2% (3) | 10 N/cm |
|  | 4–8% | 3% (3) | 13 N/cm |
|  | 4–8% | 4% (3) | 17 N/cm |
| Comparison | 0–2% (1) | — | 10 N/cm |
| Example V₂ | 2–4% | — | 4 N/cm |
|  | 4–8% | — | 1 N/cm |

(1) Fabric dried at 180° C. for 3 minutes and coated immediately.
(2) Vinyltriethoxysilane.
(3) Mixture containing 42% by weight of ethenyltriacetate silanetriol and 58% by weight of trimethoxy(3-oxiranylmethoxypropyl)silane.

EXAMPLE 11

The fabric prepared in accordance with the procedure of Example 1(C) is placed "face to face" in an oven heated at 150° C. between metal plates and a pressure of 500 kg/m². After 3 months, the fabric separates by its own weight. This illustrates that the coated fabric is free of blocking.

EXAMPLE 12

The procedure of Example 1(C) is repeated except that 1% by weight of the flame retardant prepared in Example (c) is added to the silicone coating composition. The flame resistance of the coated fabric is determined in accordance with ASTM D-2863-70. The extent of flame resistance is determined by the LOI (limited oxygen index) value. The higher the LOI value the greater the flame resistance. In a horizontal burning test in accordance with FM VSS302 the coated fabric is non-flammable and shows a burning speed lower than 1 cm/per minute. The LOI value is shown in Table II.

Comparison Example V$_3$

The procedure of Example 12 is repeated except that the flame retardant of Example (C) is omitted. In a horizontal burning test in accordance with FM VSS302, the coated fabric burns with a speed of 6 cm per minute.

TABLE II

| Example | LOI value |
|---|---|
| 12 | 31% |
| Comparison Example V$_3$ | 24% |

What is claimed is:

1. A fabric impregnated with a silicone composition comprising (a) an organopolysiloxane having aliphatic unsaturation, (b) an organohydrogenpolysiloxane having Si-bonded hydrogen atoms in a silicon to hydrogen ratio of from 10:1 to 1:1, (c) a catalyst capable of promoting the addition of SiH groups to the aliphatic unsaturated groups, (d) a hydrophobic silica filler, (e) a flame retardant and optionally (f) an adhesion promoting agent.

2. The fabric of claim 1, wherein the organopolysiloxane (a) has a viscosity of from 5 to 100,000 mPa·s at 25° C.

3. The fabric of claim 1, wherein the organopolysiloxane (a) has terminal aliphatic unsaturated.

4. The fabric of claim 1, wherein the organopolysiloxane (a) has terminal vinyl groups.

5. The fabric of claim 1, wherein the organohydrogenpolysiloxane (b) has a viscosity of from 5 to 1000 mPa·s at 25° C.

6. The fabric of claim 1, wherein the organohydrogenpolysiloxane (b) has a silicon to hydrogen ratio of 1:1.

7. The fabric of claim 1, wherein the catalyst (c) is selected from the group consisting of a platinum metal, a platinum compound and a platinum complex.

8. The fabric of claim 1, wherein the hydrophobic silica filler (d) is treated with a disilazane hydrophobic agent.

9. The fabric of claim 1, wherein the hydrophobic silica filler (d) is treated with an organoalkoxysilane.

10. The fabric of claim 1, wherein the hydrophobic silica filler (d) is treated with an organopolysiloxane.

11. The fabric of claim 1, wherein the flame retardant (e) is aluminum hydrate.

12. The fabric of claim 11, wherein the aluminum hydrate is present in an amount of from 50 to 150% by weight based on the weight of the organopolysiloxane (a).

13. The fabric of claim 1, wherein the flame retardant (e) is carbon black.

14. The fabric of claim 1, wherein the flame retardant (e) is a mixture containing carbon black and aluminum hydrate.

15. The fabric of claim 1, wherein the flame retardant (e) contains (1) from 60 to 80% by weight of a diorganopolysiloxane having from 75 to 85 mol percent of dimethylsiloxane units and 15 to 25 mol percent of vinylmethylsiloxane units, (2) 20 to 35% by weight of a metal oxide selected from the group consisting of (i) titanium dioxide, (ii) zirconium dioxide, (iii) zinc oxide, (iv) Ce(III) oxide and (v) Ce(IV) oxide, (3) 0.05 to 0.25% by weight of platinum calculated as the element and (4) 1 to 5% by weight of an organosilicon compound having basic nitrogen bonded via carbon to silicon, in which the sum of (1) to (4) adds up to 100% by weight based on the total weight of the flame retardant (e).

16. The fabric of claim 1, wherein the fabric has a moisture content of at least 2% and the silicone composition contains an adhesion promoting agent.

17. The fabric of claim 1, wherein the fabric is treated with an adhesion promoting agent.

18. The fabric of claim 1, wherein the organopolysiloxane (a) and organohydrogenpolysiloxane (b) are employed in a ratio such that the Si-bonded hydrogen to Si-bonded aliphatic unsaturated groups is in the range of from 10:1 to 1:1.

19. An air bag which is prepared from the fabric of claim 1.

20. A process for coating a fabric with a silicone composition which comprises applying to the fabric a silicone composition comprising (a) an organopolysiloxane having aliphatic unsaturation, (b) an organohydrogenpolysiloxane having Si-bonded hydrogen atoms in a ratio of silicon to hydrogen of from 1:1 to 1:3, (c) a catalyst capable of promoting the addition of SiH groups to the aliphatic unsaturated groups, (d) a hydrophobic silica filler and (e) a flame retardant and optionally (f) an adhesion promoting agent.

21. The process of claim 20, wherein the organopolysiloxane (a) and organohydrogenpolysiloxane (b) are employed in a ratio such that the Si-bonded hydrogen to Si-bonded aliphatic unsaturated groups is in the range of from 10:1 to 1:1.

22. The process of claim 20, wherein the hydrophobic silica filler is treated with a hydrophobic agent.

23. The process of claim 22, wherein the hydrophobic agent is a disilazane.

24. The process of claim 20, wherein the fabric is treated with an adhesion promoting agent prior to the application of the silicone composition.

25. The fabric obtained from the process of claim 20.

26. The fabric obtained from the process of claim 24.

27. An air bag which is prepared from the fabric prepared in accordance with the process of claim 20.

28. An air bag which is prepared from the fabric prepared in accordance with the process of claim 24.

* * * * *